US009273242B2

(12) United States Patent
Al-Yami et al.

(10) Patent No.: US 9,273,242 B2
(45) Date of Patent: Mar. 1, 2016

(54) HIGH DENSITY CEMENT FORMULATION TO PREVENT GAS MIGRATION PROBLEMS

(71) Applicant: Saudi Arabian Oil Company, Dhahran (SA)

(72) Inventors: Abdullah Saleh Al-Yami, Dhahran (SA); Ahmad Saleh Al-Humaidi, Dammam (SA)

(73) Assignee: Saudi Arabian Oil Company (SA)

( * ) Notice: Subject to any disclaimer, the term of this patent is extended or adjusted under 35 U.S.C. 154(b) by 0 days.

(21) Appl. No.: 14/480,874

(22) Filed: Sep. 9, 2014

(65) Prior Publication Data

US 2015/0107494 A1    Apr. 23, 2015

Related U.S. Application Data

(60) Provisional application No. 61/875,493, filed on Sep. 9, 2013.

(51) Int. Cl.
*C04B 14/04* (2006.01)
*C09K 8/493* (2006.01)
*C04B 28/02* (2006.01)
*C09K 8/48* (2006.01)
*C04B 14/06* (2006.01)
*C04B 22/00* (2006.01)
*C04B 22/06* (2006.01)

(52) U.S. Cl.
CPC ............... *C09K 8/493* (2013.01); *C04B 14/04* (2013.01); *C04B 14/06* (2013.01); *C04B 22/008* (2013.01); *C04B 22/06* (2013.01); *C04B 28/02* (2013.01); *C09K 8/48* (2013.01)

(58) Field of Classification Search
CPC ........................................................ C04B 14/04
See application file for complete search history.

(56) References Cited

U.S. PATENT DOCUMENTS

| 4,935,060 | A  | * | 6/1990 | Dingsoyr | ............. | 106/719 |
| 8,360,151 | B2 |   | 1/2013 | Williams et al. | | |
| 2012/0073813 | A1 | * | 3/2012 | Zamora et al. | ............. | 166/285 |
| 2012/0152541 | A1 |   | 6/2012 | Gabilly et al. | | |

FOREIGN PATENT DOCUMENTS

EP         2586754 A1    5/2013

OTHER PUBLICATIONS

PCT International Search Report and the Written Opinion; dated Jan. 16, 2015; International Application No. PCT/US2014/054640; International File Date: Sep. 9, 2014.
Al-Yami, A. S., et al.; An Innovative Cement Formula to Prevent Gas Migration Problems in HT/HP Wells; 2009 SPE International Symposium on Oilfield Chemistry held in The Woodlands, Texas; Apr. 20-22, 2009; pp. 1-10; SPE-120885.
Drecq, P. and Parcevaux, P.A.: "A Single Technique Solves Gas Migration Problems Across a Wide Range of Conditions," paper SPE 17629 presented in the 1988 International Meeting on Petroleum Engineering held in Tianjin, China, Nov. 1-4.

(Continued)

*Primary Examiner* — Paul Marcantoni
(74) *Attorney, Agent, or Firm* — Bracewell LLP; Constance Gall Rhebergen; Linda L. Morgan

(57) ABSTRACT

The invention provides a high density cement composition for preventing gas migration. The composition includes a silica sand component, a silica flour component, a hematite component, a manganese tetraoxide component, and an expansion additive component.

17 Claims, 1 Drawing Sheet

(56) References Cited

OTHER PUBLICATIONS

Jennings, S.S., Al-Ansari, A.A., Al-Yami, A.S.: "Gas Migration After Cementing Greatly Reduced," paper SPE 81414 presented at the 2003 Middle East Oil Show & Conference held in Bahrain, Apr. 5-8.

Mata, F., Diaz, C. and Villa H.: "Ultralightweight and Gas Migration Slurries: An Excellent Solution for Gas Wells," paper SPE 102220 presented at the 2006 Annual Technical Conference and Exhibition held in San Antonio, Texas, Sep. 5-7.

Mohammadi Pour, M. and Moghadasi, J.: "New Cement Formulation That Solves Gas Migration Problems in Iranian South Pars Field Conditions," paper SPE 105663 presented at 2007 the Middle East Oil & Gas Show and Conference held in Bahrain, Mar. 1-3, 2007.

Pokhriyal, J., Gaudlip, T., William, R.S.: "Use of Concrete Technology for High-Density Cement Systems in South Texas," paper SPE 67259 presented in the 2001 Production and Operations Symposium held in Oklahoma City, OK, Mar. 24-27.

* cited by examiner

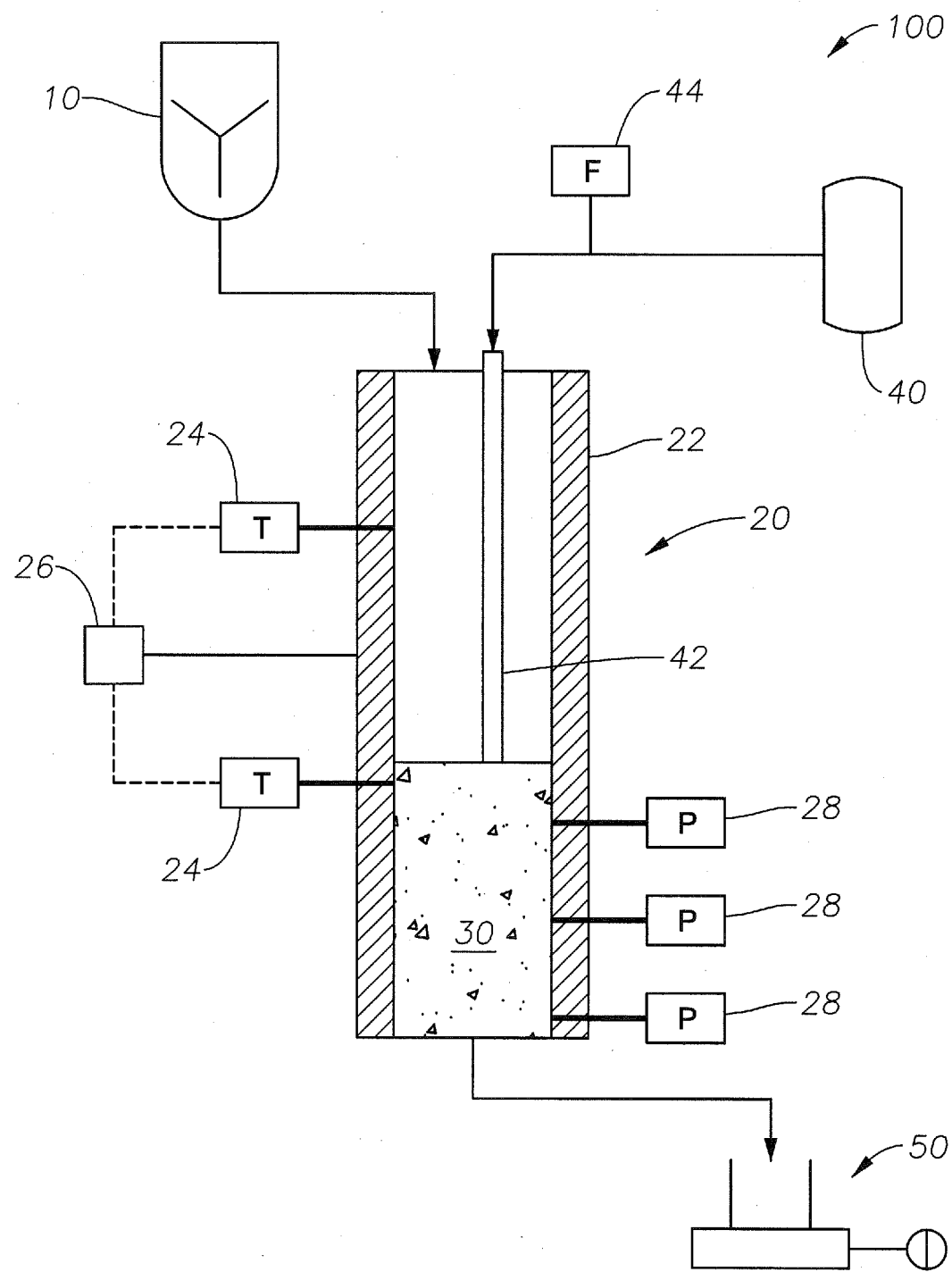

HIGH DENSITY CEMENT FORMULATION TO PREVENT GAS MIGRATION PROBLEMS

CROSS-REFERENCE TO RELATED PATENT APPLICATIONS

This application is related to, claims priority to, and the benefit of, U.S. Provisional Application No. 61/875,493, filed on Sep. 9, 2013, titled "High Density Cement Formulation to Prevent Gas Migration Problems." For purposes of United States patent practice, this application incorporates the contents of the Provisional Application by reference in its entirety.

BACKGROUND

1. Field of the Invention

This invention generally relates to a high-density cement composition for preventing gas migration in deep gas wells.

2. Background of the Invention

Gas migration through cement columns has been an industry problem for many years. The most problematic areas for gas migrations are in deep gas wells. For instance, approximately 80% of wells in the Gulf of Mexico have gas transmitted to surface through cemented casings. In Saudi Arabia, the most problematic operations for gas migration are those involving deep gas wells. In such instances, drilling fluid densities as high as 163 pcf (pounds per cubic foot) are used to control gas or formation fluid influx. To control gas migration, cement densities for successfully cementing of the zone of interest can be as high as 170 pcf. As a cement slurry sets, hydrostatic pressure is reduced on the formation. During this transition, reservoir gases can travel up through the cement column resulting in gas being present at the surface. The permeable channels from which the gas flows cause operational and safety problems at the well site.

Causes of gas channeling include: 1) bad mud/spacer/cement design that allows passage of water and gas, resulting in failures in cementing operations, 2) high fluid loss from cement slurries, which causes water accumulation and results in micro-fractures within the cement body, and 3) cements not providing sufficient hydrostatic pressure to control the high pressure formation.

Good displacement practices with the use of stable, fast-setting, low-fluid-loss slurries are important in solving gas zonal isolation problems in many, but not all, cementing operations failures. The resulting slurry properties are affected by the slurry composition and the well conditions. The slurry composition effects include the dehydration of the liquid phase, gelation of the slurry, settling of the solid particles, and packing of the solid particles. The setting of cement starts when water is first in contact with the cement. Initially, the cement slurry column behaves as a pure fluid and fully transmits the hydrostatic pressure. As the cement starts to set, settling and packing of the slurry continues. Once the cement structure starts to gel, the pore pressure inside the cement column starts to decrease until it becomes equal to the pressure of the formation. As the cement pore pressure decreases, this allows the gas to invade the cement pore spaces. If the cement permeability to gas is high and gas invasion occurs, the gas can permeate throughout the cement matrix, charging it with enough gas (and pore pressure) to inhibit the hydration process from closing the pore spaces. When the gas pressure is higher than the hydrostatic pressure after the cement initially sets, a channel forms and gas continues to migrate even after decreasing the formation pressure.

There is a strong relationship between water separation in cement slurry and the loss of hydrostatic head of the cement columns. One way to improve gas migration control is by using fluid loss and expansion additives. Fluid loss additives retain the water needed for hydration of cement and slowly release it during the complete hydration process. In addition, fluid loss additives minimize the ability of fluids to flow though the cement porosity. Using expansion additives can improve bonding at the casing/cement and cement/formation interfaces.

Gas can migrate when the cement is in the slurry form, if densities are not well designed. Slurry setting will prevent hydrostatic pressure transmission, and consequently, will reduce pressure facing the gas zone. Slurries that minimize this transition time are desirable. Hardened cement should be resistant to mechanical and thermal stresses to avoid fractures, which would become an easy path for the gas. Optimizing slurry design includes designing compositions to have no free water and to minimize fluid loss. Adjusting cement properties based on conventional testing is not enough to confirm that the slurry will be gas migration resistant. Testing slurries on a gas flow simulator is a useful tool for the optimizing process.

The use of latex additives can help control gas migration in cement because cement pore pressure drop is delayed and the transition time between the liquid and set state is shortened. However, as long as the cement behaves as a true liquid, gas can channel up in the annulus when gas pressure is higher than cement hydrostatic pressure. Thus, density of the cement must be designed according to the formation pressure and the fracture gradient, and must be controlled during the entire cementing operation. Latex additives can assist in the prevention of gas/fluid migration during the setting of cement. For wells that have considerable fluid or gas flow, latex may be recommended. On wells with mud weights equal to or greater than 135 pcf, latex may be recommended. For wells with drilling fluid densities that are less than 120 pcf, conventional dry fluid loss additives may also be recommended. These wells with high mud density usually have had considerable flow from the formation. The time needed to build the mud volumes to obtain the proper mud weight is usually more than a day.

Expanding cement additives are useful for wells that will be drilled with mud densities that are less than 15 pcf from the previous hole section. The reduction of pressure from reducing the mud density can cause the casing to shrink. This shrinkage can cause the cement-casing bond to break, which will allow for gas flow. This situation is more likely to occur as the depth increases. Expanding additives are also generally recommended for cement jobs where a gas producing formation is being cemented and the depth is greater than 10,000 ft.

Cementing an unbalanced wellbore in high-pressure formations is challenging because the cement will migrate up in the cement column. One preferred procedure is to kill the well using mud and then perform the cementing operation to reduce the gas migration potential. In Saudi Arabia, the wells are generally killed before cementing operations, however, higher-pressure formations with higher gas migration problems require higher cement density.

The most common problem associated with heavy weight cement slurries using hematite is settling. Sometimes, settling can be controlled by anti-settling chemicals in the lab. However, controlling hematite settling in the field has historically proven difficult.

Portland cement has tricalcium silicate ($C_3S$) and dicalcium silicate ($C_2S$). When mixed with water, both hydrate to form calcium silicate hydrate (C—S—H) gel. The C—S—H gel can provide good compressive strength for the cement at temperature up to 230° F. However, at higher temperatures, C—S—H gel forms a phase called alpha dicalcium silicate hydrate ($\alpha$-$C_2SH$) which decreases the compressive strength and permeability of set cement. To prevent the formation of $\alpha$-$C_2SH$, the lime-silica ratio (C/S) is reduced by addition of silica-based materials. The addition of silica material to cement, when hydrated, will form a phase known as tobermorite ($C_5S_6H$) at 230° F. instead of $\alpha$-$C_2SH$ phase and high strength cement results.

Despite these various approaches to cement compositions, current high-density cement formulations do not provide good gas migration prevention due to settling and increase in permeability. To solve the settling problem and reduce permeability, a new formula is needed to prevent gas migration problems in cementing high-pressure formations.

SUMMARY

A high density cement composition for preventing gas migration composition includes a silica sand component, a silica flour component, a hematite component, a manganese tetraoxide component and an expansion additive component.

A high density cement composition for preventing gas migration composition includes a silica sand component, a silica flour component, a hematite component, a manganese tetraoxide component, an expansion additive component, a retarder component, a friction reducer component, a gas block stabilizer (GBS) component and a dispersant component.

The cement system results in significant gas prevention. The system outperforms available formulations and has the potential to improve wellbore isolation in deep gas wells.

BRIEF DESCRIPTION OF THE DRAWING

So that the manner in which the features and benefits of the invention, as well as others which will become apparent, may be understood in more detail, a more particular description of the embodiments of the invention may be had by reference to the embodiments thereof which are illustrated in the appended drawings, which form a part of this specification.

FIG. 1 shows a schematic diagram of the cement gas migration system (CGMS).

FIG. 1 and their description facilitate a better understanding of high density cement composition for preventing gas migration. In no way should FIG. 1 limit or define the scope of the invention. FIG. 1 is a simple diagram for ease of description.

DETAILED DESCRIPTION

Although the following detailed description contains many specific details for purposes of illustration, it is understood that one of ordinary skill in the art will appreciate that many examples, variations, and alterations to the following details are within the scope and spirit of the invention. Accordingly, the exemplary embodiments of the invention described herein and provided in the appended figures are set forth without any loss of generality, and without imposing limitations, on the claimed invention.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an" and "the" include plural referents, unless the context clearly dictates otherwise.

"Optionally" and its various forms means that the subsequently described event or circumstance may or may not occur. The description includes instances where the event or circumstance occurs and instances where it does not occur. "Detect" and its conjugated forms should be interpreted to mean the identification of the presence or existence of a characteristic or property. "Determine" and its conjugated forms should be interpreted to mean the ascertainment or establishment through analysis or calculation of a characteristic or property.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps. The invention illustrative disclosed suitably may be practiced in the absence of any element which is not specifically disclosed, including as "consisting essentially of" and "consisting of". The referenced elements, components or steps may be present, utilized or combined with other elements, components or steps not expressly referenced.

In an embodiment of the high-density cement composition for preventing gas migration, the cement includes a silica sand component, a silica flour component, a hematite component, a manganese tetraoxide component and an expansion additive component.

In another embodiment of the high-density cement composition for preventing gas migration, the cement includes a silica sand component, a silica flour component, a hematite component, a manganese tetraoxide component, an expansion additive component, a retarder component, a friction reducer component, a GBS stabilizer component and a dispersant component.

In an embodiment of the high-density cement composition, the high-density cement composition has a density in a range between about 130 pcf and about 180 pcf. In some embodiments, the high-density cement composition has a density about equal to 130 pcf. In some embodiments, the high-density cement composition has a density about equal to 135 pcf. In some embodiments, the high-density cement composition has a density about equal to 140 pcf. In some embodiments, the high-density cement composition has a density about equal to 145 pcf. In some embodiments, the high-density cement composition has a density about equal to 150 pcf. In some embodiments, the high-density cement composition has a density about equal to 155 pcf. In some embodiments, the high-density cement composition has a density about equal to 160 pcf. In some embodiments, the high-density cement composition has a density about equal to 165 pcf. In some embodiments, the high-density cement composition has a density about equal to 170 pcf. In some embodiments, the high-density cement composition has a density about equal to 175 pcf. In some embodiments, the high-density cement composition has a density about equal to 180 pcf. In some embodiments, the high-density cement composition has a density of at least 170 pcf.

The silica sand component is any naturally occurring or man-made silica sand. The silica sand component can have a variety of particle sizes. In an embodiment of the high-density cement composition, the silica sand component has an average particle size in a range of from about 100 to about 200 microns. In some embodiments, the silica sand component has an average particle size of about 100 microns. In some embodiments, the silica sand component has an average particle size of from about 175 to about 200 microns. In some embodiments, the silica sand component has an average particle size of about 175 microns. In some embodiments, the silica sand component has an average particle size of about 180 microns. In some embodiments, the silica sand component has an average particle size of about 185 microns. In some embodiments, the silica sand component has an average particle size of about 190 microns. In some embodiments, the silica sand component has an average particle size of about 195 microns. In some embodiments, the silica sand component has an average particle size of about 200 microns.

The silica flour component is used in combination with silica sand to formulate the high-density cement to resist gas migration problems. In an embodiment of the high-density cement composition, the average particle size of silica flour is about 15 microns. The combination of the silica sand component and silica flour component increases the solids packing density of the cement composition and thus reduces the permeability of set cement to gas flow.

The hematite component can be from any readily available source. In an embodiment of the high-density cement composition, the hematite has a specific gravity of about 4.95. In some embodiments, the hematite has a mean particle size distribution of about 45 microns.

The manganese tetraoxide component can be from any readily available source. The manganese tetraoxide component can be in the form of particles. In an embodiment of the high-density cement composition, the manganese tetroxide ($Mn_3O_4$) has an average particle size of about 5 microns. In some embodiments, the properties of the manganese tetraoxide particles are such that the small particle size, spherical shape, and high specific gravity of manganese tetraoxide make it a good weighting material to reduce solids loading and settling compared to other compounds, such as $CaCO_3$ and $BaSO_4$. The low plastic viscosity associated with manganese tetraoxide component results in a lower friction in particle-to-particle interactions due to their spherical shape.

The expansion additive component can be selected from known expansion additive compounds. In an embodiment of the high-density cement composition, the expansion additive component can be selected from the group consisting of zinc, magnesium, iron, and aluminum powders, and combinations thereof. In a further embodiment, the expansion additive component is a calcined magnesium oxide. In general, the hydration of magnesium oxide to magnesium hydroxide provides an expansive force within the cement matrix.

The expansion additive component is important in cementing casings and liners because casing diameters are affected by changes in temperature and pressure and their diameters are reduced or expanded, which in either case can lead to micro annulus. The expansion additive component is used in the cement composition to maintain a seal around the casing and against the formation so that good bonding can be achieved. In an embodiment of the high-density cement composition, the expansion additive provides excellent expansion even at extreme high temperature. In some embodiments, the expansion additives are added when the temperature is greater than about 140° F. Generally, there is little or no benefit added when using expansion additives at a temperature lower than about 140° F. At such low temperatures, the hydration of expansion additives is too slow to provide the desired expansion.

In an embodiment of the high-density cement composition, the high-density cement composition further includes a retarder component. In some embodiments, the retarder component includes both a high temperature retarder and a low temperature retarder. In further embodiments the low temperature retarder is calcium lignosulfonate. In further embodiments the high temperature retarder is ethylene glycol. In further embodiments the high temperature retarder is a mixture of a sodium salt of an organic acid and an inorganic salt. Other retarders than can be used include modified lignosulfonates, sulfamethylated lignins, inorganic salts, acrylic polymers, sodium lignosulfonates, sodium tetraborate, aromatic polymer derivatives, a mixture of a sodium salt of alicyclic acid and an aminated aromatic polymer, an aliphatic amide polymer, scleroglucan, copolymers of isobutene and maleic anhydride, amino-N-([alkylidene]phosphonic acid) derivatives, alkanolamine-hydroxy carboxy acid salts (for example, tartaric acid and ethanolamine), phosphonocarboxylic acids, dicyclopentadiene bis(methylamine)methylenephosphonate, lignosulfonate derivatives, carbohydrates grafted with vinyl polymers, carboxymethyl hydroxyethylcellulose, wellan gum, Borax, carrageenan, polyethylene amine derivatives and amides, copolymers from maleic acid and 2-acrylamido-2 methylpropane sulfonic acid, ethylenediamine-tetramethylene phosphonic acid, polyoxyethylene phosphonic acid, citric acid, and polyacrylic acid phosphinate.

In an embodiment of the high-density cement composition, the high-density cement composition further includes a friction reducer component. In some embodiments, the friction reducer component is a sulfonic acid salt or an aromatic polymer derivative. Other cement dispersants include polyoxyethylene sulfonate, acetone formaldehyde cyanide resins, polyoxethylated octylphenol, copolymers of maleic anhydride and 2-hydroxypropyl acrylate, allyloxybenzene sulfonate, allyloxybenzene phosphonate, ferrous lignosulfonate, ferrous sulfate, tannic acid, alkali lignosulfonate, acetone polycondensate, formaldehyde polycondensate, sulfonated naphthalene formaldehyde condensate, sulfonated indene resins and sulfonated indene-cumarone resins, melamine sulfonate polymers, vinyl sulfonate polymers, styrene sulfonate polymers, polyethyleneimine phosphonate and casein polysaccharides.

In an embodiment of the high-density cement composition, the high-density cement composition further includes a fluid loss additive component. In some embodiments, the fluid loss additive component is an acrylamide copolymer, a hydroxyethyl cellulose, an aliphatic amide polymer, an acrylic polymer, bentonite, latex polymers, organic polymers, vinyl sulfonate fluid loss additives based on the 2-acrylamido-2-methyl-propane sulfonic acid, gilsonite, additives to latex (for example, styrene-butadiene latex in combination with non-ionic and anionic surfactants), octylphenol ethoxylate, polyethylene oxide, copolymers of maleic anhydride and 2-hydroxypropyl acrylate.

In an embodiment of the high-density cement composition, the high-density cement composition further includes an expansion additive component. Calcium oxide (CaO) and magnesium oxide (MgO) are expanding additives. In an embodiment, the expansion additive component is a mixture of calcium oxide and magnesium oxide.

In an embodiment of the high-density cement composition, the high-density cement composition further includes a dispersant component. In some embodiments, the dispersant component is a sulphonated aromatic polymer. Other friction reducing additives include polyoxyethylene sulfonate, acetone formaldehyde cyanide resins, polyoxethylated octylphenol, copolymers of maleic anhydride and 2-hydroxypropyl acrylate, allyloxybenzene sulfonate, allyloxybenzene phosphonate, ferrous lignosulfonate, ferrous sulfate, tannic acid, alkali lignosulfonate, acetone polycondensate, formaldehyde polycondensate, sulfonated naphthalene formaldehyde condensate, sulfonated indene resins and sulfonated indene-cumarone resins, melamine sulfonate polymers, vinyl sulfonate polymers, styrene sulfonate polymers, polyethyleneimine phosphonate and casein polysaccharides.

In an embodiment of the high-density cement composition, the high-density cement composition further includes a gas block stabilizer (GBS) component. In some embodiments, the GBS component is an aminated aromatic salt, an alkyl ether sulfate or an aminated aromatic polymer.

Some embodiments of the present invention provide compositions that are useful not only to reduce settling but also to reduce the porosity of the composition by having different size distributions of particles or components.

Embodiments of the present invention do not use proppants. Known proppants do not aid in increasing the density of the cement compositions and would not improve penetration against gas migration. Thus, use of proppants is not desired in embodiments of the present invention. Additionally, embodiments of the present invention do not use metal silicon alloys, zeolites, or activator agents (including sodium silicates), as have been used in other known cement compositions.

EXAMPLES

Examples of specific embodiments facilitate a better understanding of a high density cement composition for preventing gas migration. In no way should the Examples limit or define the scope of the invention.

Various compositions were evaluated for possible use for cementing gas wells. Addition of inert particles to cement and their effect on gas migration prevention was investigated, and the study surprisingly found that certain compositions yielded particularly beneficial results for preventing gas migration.

Slurry Preparation Procedure

The experimental formulae were prepared in the lab using the standard API blender. The maximum rotational speed used during slurry preparation was 12,000 rotations per minute (rpm). The slurry was mixed for 15 seconds at 4,000 rpm and 35 seconds at 12,000 rpm.

Slurry Rheology

The slurry was conditioned in the atmospheric consistometer before obtaining the rheological readings. A Fann viscometer (Model-35) was used to evaluate the slurry apparent viscosity.

Thickening Time Test

The prepared slurry was then poured into an API standard HP/HT consistometer slurry cup for thickening time assessment to evaluate the pumpability of the cement slurry.

Free Water and Slurry Sedimentation Tests

When cement slurry is allowed to stand for a period of time prior to set, water may separate from the slurry migrating upwards. This separation can result in zone isolation problems. The free water test is designed to measure water separation using a 250 mL graduated cylinder. The duration of the test is 2 hours according to the API 10A procedure. Settling can be measured by comparing densities of different sections of the cement column cured. The cylindrical shaped cell, used to cure the cement formula for the settling test, had a diameter of 1.4" and length of 12". Sections of 2" long were taken from the top, middle, and bottom of the cement column sample. The cement formula was cured at 3,000 psi and 280° F. for 24 hours. The density of each section of the cement was measured using Model-1330 gas pycnometer.

Gas Migration Setup

The gas migration model consisted of the following components: computer with data acquisition, full-length permeability determination, two partial length permeability determinations, cement volume change measurement, gas flow meter, and electronic filtrate weight determination. The pressure and temperature limitations were 2,000 psi and 350° F. Differential pressure must be used in the system when testing for deep gas migration with a maximum limit of 350° F.

A schematic diagram of the cement gas migration system (CGMS) is shown in FIG. 1. Cement slurry is mixed according to the API 10B-2 procedure. In CGMS 100, the sample cement slurry stirs in atmospheric consistometer 10 for a time to reach bottom ("TRB").

CGMS 100 includes slurry cell 20. Slurry cell 20 is operable to maintain an internal isothermal condition using heating jacket 22, which wraps around the exterior of slurry cell 20, several temperature probes 24, and a temperature controller 26 that is operable to monitor several temperature probes 24 and modify the heat input into slurry cell 20 using heating jacket 22 as needed to maintain the isothermal condition. Slurry cell 20 also has several pressure probes 28 that are operable to measure the pressure in several locations within slurry cell. Pressure probes 28 are located such that when the cement slurry is in slurry cell the pressures detected by pressure probes 28 are associated with the pressure within different portions of the cement slurry.

Sample cement slurry 30 is transferred to slurry cell 20, which is pre-heated to a temperature of about 280° F., such that sample cement slurry 30 fills slurry cell 20 to about 900 cm$^3$. Nitrogen gas from nitrogen storage 40 is injected through rodded accumulator 42 into sample cement slurry 30 at the testing pressure of about 1,500 psi. Gas mass flow meter 44 detects the flow rate of the nitrogen gas during the test.

Balance 50 is operable to detect a fluid mass change in sample cement slurry 30. That is, if sample cement slurry 30 remains fluidic and a portion is pushed out of slurry cell 20 during testing then balance 50 will detect the fluid mass loss from sample cement slurry 30 as a mass gain at balance 50.

The test is being done while the cement is in liquid state until it develops into a semi-solid form, which is approximately five hours, and if the nitrogen is determined not to have migrated through the cement slurry. Gas injection pressure and gas flow rate are detected during the test. Detection of an increase in gas flow rate is an indication of gas migration through the cement slurry in most tests. The cement slurry does not transform into a semi-solid form if there is a high flow rate gas leak through the cement. A good cement formulation is one that gives the least amount of flow (as determined using differential pressure between several pressure probes 28) and minimum overall fluid loss (as determined by an increase in detected fluid mass at balance 50).

Results and Discussion

All cement formulations were designed to have the properties listed in Table 1. Low and high temperature retarders were used to slow down the setting of the cement and fluid loss additives to maintain the water within the cement slurry. Gas block additive (latex) was used to coat the cement and aid in gas migration prevention.

TABLE 1

Properties for preventing gas migration at 280° F. and 1,500 psi.

| Cementing Requirement | Range |
|---|---|
| Thickening Time, hrs | 7-9 |
| Fluid Loss (ml/30 min.) | <50 |
| Free Fluid, % | 0 |
| Rheology, YP | >1 |
| Sonic Strength (50-500 psi) | <1 hour |
| Settling Density Difference | <5 pcf |
| Fluid Migration (time for gas break through) | >5 hours |

Effect of Manganese Tetraoxide

Table 2 (Tests 1-14) gives detailed concentrations of manganese tetraoxide, silica sand, expansion additives, and gas block additives. The table shows the duration of the test, fluid loss collected, and gas permeability of each cement slurry. The first parameter considered was the test duration, which should be around 5 hours without any sudden gas breakthrough. The test was terminated after 5 hours in order to clean the cell before the cement slurry set. Fluid loss and gas permeability were also important parameters to evaluate cement formulations. In order to have a good cement formulation there should be nearly zero fluid loss and zero gas permeability. Using manganese tetraoxide by itself as a weighting material did not result in good fluid loss control. The main problem with all of these tests was the fluid loss control and the sudden gas break through. Gas block additives were varied from 1 to 2.5 GPS without any success in solving this problem. The lowest fluid loss was 42 mL when 90% BWOC (by weight of cement) $Mn_3O_4$ was used, however, a sudden gas breakthrough after 223 minutes was reported. As mentioned above, high fluid loss from cement slurries will lead to gas migration through the cement column.

TABLE 2

Lab results from cement formulations showing the effects of $Mn_3O_4$ at 280° F. and 1,500 psi. For Table 2, S.S.: Silica Sand; E.: Expansion additive; H.T.R.: High Temperature Retarder; L.T.R.: Low Temperature Retarder; FL.: Fluid Loss additive; GL-G: Class G; S.F: Silica Flour; G.B: Gas Block Additive; G.B.S.: Gas Block Stabilizer; and D.: Dispersant. Specific components are identified in Table 6.

| Test# | Test Duration (min) | Fluid Loss (mL) | Gas Permeability (mD) | Formulation |
|---|---|---|---|---|
| 1 | 223 | 42 | 0 | CL-G cement + 25% BWOC S.S. + 5% BWOC E. + 90% BWOC $Mn_3O_4$ + 1.5 GPS G.B. + 0.25 GPS G.B.S. + 1.15% BWOC H.T.R. + 0.7% BWOC D. + 0.45% BWOC L.T.R. |
| 2 | 240 | 64 | 0 | CL-G cement + 25% BWOC S.S. + 5% BWOC E. + 70% BWOC $Mn_3O_4$ + 1.5 GPS G.B. + 0.25 GPS G.B.S. + 1.15% BWOC H.T.R. + 0.7% BWOC D. + 0.45% BWOC L.T.R. |
| 3 | 301 | 52 | 0.1 | CL-G cement + 25% BWOC S.S. + 5% BWOC E. + 80% BWOC $Mn_3O_4$ + 1.5 GPS G.B. + 0.25 GPS G.B.S. + 1.15% BWOC H.T.R. + 0.7% BWOC D. + 0.45% BWOC L.T.R. |
| 4 | 350 | 75 | 0.2 | CL-G cement + 25% BWOC S.S. + 5% BWOC E. + 60% BWOC $Mn_3O_4$ + 1.5 GPS G.B. + 0.25 GPS G.B.S. + 1.15% BWOC H.T.R. + 0.7% BWOC D. + 0.45% BWOC L.T.R. |
| 5 | 122 | 44 | 1.5 | CL-G cement + 25% BWOC S.S. + 5% BWOC E. + 90% BWOC $Mn_3O_4$ + 1.0 GPS G.B. + 0.25 GPS G.B.S. + 1.15% BWOC H.T.R. + 0.7% BWOC D. + 0.45% BWOC L.T.R. |
| 6 | 102 | 66 | 7.1 | CL-G cement + 25% BWOC S.S. + 5% BWOC E. + 90% BWOC $Mn_3O_4$ + 1.5 GPS G.B. + 0.2 GPS G.B.S. + 1.35% BWOC H.T.R. + 0.7% BWOC D. + 0.50% BWOC L.T.R. |
| 7 | 116 | 69 | 7.62 | CL-G cement + 25% BWOC S.S. + 5% BWOC E. + 90% BWOC $Mn_3O_4$ + 1.0 GPS G.B. + 0.2 GPS G.B.S. + 1.35% BWOC H.T.R. + 0.7% BWOC D. + 0.50% BWOC L.T.R. |
| 8 | 296 | 117 | 0 | CL-G cement + 25% BWOC S.S. + 5% BWOC E. + 90% BWOC $Mn_3O_4$ + 2.0 GPS G.B. + 0.25 GPS G.B.S. + 1.2% BWOC H.T.R. + 0.7% BWOC D. + 0.55% BWOC L.T.R. |
| 9 | 301 | 82 | 0 | CL-G cement + 25% BWOC S.S. + 5% BWOC E. + 90% BWOC $Mn_3O_4$ + 2.5 GPS G.B. + 0.25 GPS G.B.S. + 0.8% BWOC H.T.R. + 0.7% BWOC D. + 0.45% BWOC L.T.R. |
| 10 | 300 | 134 | 0.1 | CL-G cement + 25% BWOC S.S. + 5% BWOC E. + 70% BWOC $Mn_3O_44$ + 2.0 GPS G.B. + 0.25 GPS G.B.S. + 0.8% BWOC H.T.R. + 0.7% BWOC D. + 0.45% BWOC L.T.R. |
| 11 | 153 | 73 | 10 | CL-G cement + 25% BWOC S.S. + 5% BWOC E. + 70% BWOC $Mn_3O_4$ + 2.5 GPS G.B. + 0.25 GPS G.B.S. + 0.75% BWOC H.T.R. + 0.7% BWOC D. + 0.45% BWOC L.T.R. |
| 12 | 243 | 150 | 7 | CL-G cement + 25% BWOC S.S. + 5% BWOC E. + 60% BWOC $Mn_3O_4$ + 2.0 GPS G.B. + 0.25 GPS G.B.S. + 0.75% BWOC H.T.R. + 0.7% BWOC D. + 0.45% BWOC L.T.R. |

TABLE 2-continued

Lab results from cement formulations showing the effects of $Mn_3O_4$ at 280° F. and 1,500 psi. For Table 2, S.S.: Silica Sand; E.: Expansion additive; H.T.R.: High Temperature Retarder; L.T.R.: Low Temperature Retarder; FL.: Fluid Loss additive; GL-G: Class G; S.F: Silica Flour; G.B: Gas Block Additive; G.B.S.: Gas Block Stabilizer; and D.: Dispersant. Specific components are identified in Table 6.

| Test# | Test Duration (min) | Fluid Loss (mL) | Gas Permeability (mD) | Formulation |
|---|---|---|---|---|
| 13 | 64 | 86 | 1.1 | CL-G Cement + 25% BWOC S.S. + 5% BWOC E. + 90% BWOC $Mn_3O_4$ + 1.2% BWOC H.T.R. + 0.7% BWOC D. + 0.45% BWOC L.T.R. |
| 14 | 45 | 57 | 7 | CL-G Cement + 25% BWOC S.S. + 5% BWOC E. + 110% BWOC $Mn_3O_4$ + 1.2% BWOC H.T.R. + 0.8% BWOC D. + 0.45% BWOC L.T.R. |

Effect of Manganese Tetraoxide & Hematite

Table 3 (Tests 15-27) shows detailed formulations for different weight ratios of manganese tetraoxide and hematite in the compositions. The most effective composition was achieved using 45% BWOC of $Mn_3O_4$ and 45% BWOC hematite. The fluid loss control was improved to 3.7 mL using high concentrations of gas block additive (latex) up to 3.5 GPS. Also, the test was terminated because of the sudden gas breakthrough after 231 minutes.

TABLE 3

Lab results from cement formulations showing the effect of manganese tetraoxide and hematite at 280° F. and 1,500 psi. For Table 3, S.S.: Silica Sand; E.: Expansion additive; H.T.R.: High Temperature Retarder; L.T.R.: Low Temperature Retarder; FL.: Fluid Loss additive; GL-G: Class G; S.F: Silica Flour; G.B: Gas Block Additive; G.B.S.: Gas Block Stabilizer; and D.: Dispersant. Specific components are identified in Table 6.

| Test # | Test duration (min) | Fluid loss (mL) | Gas permeability (mD) | Formulation |
|---|---|---|---|---|
| 15 | 283 | 188 | 5.5 | CL-G Cement + 60% BWOC H. + 5% BWOC E. + 30% BWOC $Mn_3O_4$ + 1.0 GPS GB + 0.1 GPS G.B.S + 1.2% BWOC H.T.R. + 0.7% BWOC D. + 0.45% BWOC L.T.R. |
| 16 | 300 | 173 | 0.1 | CL-G Cement + 75% BWOC H. + 5% BWOC E. + 25% BWOC S.S + 15% BWOC $Mn_3O_4$ + 1.5 GPS G.B. + 0.15 GPS G.B.S. + 1.2% BWOC H.T.R + 0.45% BWOC L.T.R. |
| 17 | 300 | 215 | 0 | CL-G Cement + 75% BWOC H. + 5% BWOC E. + 25% BWOC S.S. + 15% BWOC $Mn_3O_4$ + 1.0 GPS G.B. + 0.1 GPS G.B.S. + 1.2% BWOC H.T.R. + 0.7% BWOC D. + 0.45% BWOC L.T.R. |
| 18 | 104 | 82 | 5.4 | CL-G Cement + 45% BWOC H. + 5% BWOC E. + 25% BWOC S.S. + 45% BWOC $Mn_3O_4$ + 1.0 GPS G.B. + 0.2 GPS G.B.S. + 1.2% BWOC H.T.R. + 0.7% BWOC D. + 0.45% BWOC L.T.R. |
| 19 | 167 | 77 | 1.1 | CL-G Cement + 45% BWOC H. + 5% BWOC E. + 25% BWOC S.S. + 45% BWOC $Mn_3O_4$ + 1.0 GPS G.B. + 0.2 GPS G.B.S. + 1.2% BWOC H.T.R. + 0.45% BWOC L.T.R. + 0.3% BWOC F.L. |
| 20 | 143 | 57 | 1.1 | CL-G Cement + 45% BWOC H. + 5% BWOC E. + 25% BWOC S.S. + 45% BWOC $Mn_3O_4$ + 1.0 GPS G.B. + 0.2 GPS G.B.S. + 1.2% BWOC H.T.R. + 0.45% BWOC L.T.R. + 0.6% BWOC F.L. |
| 21 | 164 | 63 | 1.1 | CL-G Cement + 45% BWOC H. + 5% BWOC E. + 25% BWOC S.S. + 45% BWOC $Mn_3O_4$ + 1.5 GPS G.B. + 0.2 GPS G.B.S. + 1.2% BWOC H.T.R. + 0.45% BWOC L.T.R. |
| 22 | 186 | 57 | 1.2 | CL-G Cement + 45% BWOC H. + 5% BWOC E. + 25% BWOC S.S. + 45% BWOC $Mn_3O_4$ + 1.5 GPS G.B. + 0.2 GPS G.B.S. + 1.2% BWOC H.T.R. + 0.45% BWOC L.T.R. + 0.3% BWOC F.L. |
| 23 | 109 | 50 | 1.1 | CL-G Cement + 30% BWOC H. + 5% BWOC E. + 25% BWOC S.S. + 60% BWOC $Mn_3O_4$ + 1.5 GPS G.B. + 0.2 GPS G.B.S. + 1.2% BWOC H.T.R. + 0.45% BWOC L.T.R. |

TABLE 3-continued

Lab results from cement formulations showing the effect of manganese tetraoxide and hematite at 280° F. and 1,500 psi. For Table 3, S.S.: Silica Sand; E.: Expansion additive; H.T.R.: High Temperature Retarder; L.T.R.: Low Temperature Retarder; FL.: Fluid Loss additive; GL-G: Class G; S.F: Silica Flour; G.B: Gas Block Additive; G.B.S.: Gas Block Stabilizer; and D.: Dispersant. Specific components are identified in Table 6.

| Test # | Test duration (min) | Fluid loss (mL) | Gas permeability (mD) | Formulation |
|---|---|---|---|---|
| 24 | 123 | 40 | 1.1 | CL-G Cement + 30% BWOC H. + 5% BWOC E. + 25% BWOC S.S. + 60% BWOC $Mn_3O_4$ + 1.5 GPS G.B. + 0.2 GPS G.B.S. + 1.2% BWOC H.T.R. + 0.45% BWOC L.T.R. + 0.3% BWOC F.L. |
| 25 | 22 | 34 | 0.8 | CL-G Cement + 45% BWOC H. + 5% BWOC E. + 25% BWOC S.S. + 45% BWOC $Mn_3O_4$ + 2.5 GPS G.B. + 0.3 GPS G.B.S. + 1.2% BWOC H.T.R. + 0.45% BWOC L.T.R. + 0.2% BWOC F.L. |
| 26 | 143 | 23 | 0.1 | CL-G Cement + 45% BWOC H. + 5% BWOC E. + 25% BWOC S.S. + 45% BWOC $Mn_3O_4$ + 3.0 GPS G.B. + 0.45 GPS G.B.S. + 1.2% BWOC H.T.R. + 0.45% BWOC L.T.R. + 0.3% BWOC F.L. |
| 27 | 231 | 3.7 | 0 | CL-G Cement + 45% BWOC H. + 5% BWOC E. + 25% BWOC S.S. + 45% BWOC $Mn_3O_4$ + 3.5 GPS G.B. + 0.5 GPS G.B.S. + 1.2% BWOC H.T.R. + 0.45% BWOC L.T.R. + 0.3% BWOC F.L. |

Effect of Manganese Tetraoxide, Hematite, Silica Flour and Sand

Table 4 (Tests 28-30) shows detailed formulations for 45% BWOC of $Mn_3O_4$ and 45% BWOC hematite with different ratios of silica sand and silica flour. All three tests showed outstanding results in terms of zero gas permeability, long test period with no gas breakthrough, and minimum fluid loss. The most effective formulation was obtained when 25% BWOC silica flour and 10% BWOC silica sand were used. The results showed zero gas permeability, zero fluid loss control, and test duration time of 324 minutes.

Settling Test

There is no standard test to show the minimum density difference between the top and bottom of cured cement samples tested for settling. The results of settling depend mainly on the cement density and field experience. Based on intensive field work, samples collected from successful cement jobs at this high density (more than 150 pcf) showed results up to 3 pcf difference. Samples collected from failed jobs showed more than 5 pcf differences. Since there is less than 5 pcf difference in the density of set cement from the top compared to bottom sections, then there is no expectation of

TABLE 4

Lab results from cement formulations showing the effect of manganese tetraoxide, hematite, silica flour and sand at 280° F. and 1,500 psi. For Table 4, S.S.: Silica Sand; E.: Expansion additive; H.T.R.: High Temperature Retarder; L.T.R.: Low Temperature Retarder; FL.: Fluid Loss additive; GL-G: Class G; S.F: Silica Flour; G.B: Gas Block Additive; G.B.S.: Gas Block Stabilizer; and D.: Dispersant. Specific components are identified in Table 6.

| Test # | Test duration (min) | Fluid loss (mL) | Gas permeability (mD) | Formulation |
|---|---|---|---|---|
| 28 | 290 | 0 | 0 | CL-G Cement + 45% BWOC H. + 5% BWOC E. + 10% BWOC S.S. + 25% BWOC S.F. + 45% BWOC $Mn_3O_4$ + 3.5 GPS G.B. + 0.5 GPS G.B.S. + 1.2% BWOC H.T.R. + 0.45% BWOC L.T.R. + 0.3% BWOC F.L. |
| 29 | 316 | 1.6 | 0 | CL-G Cement + 45% BWOC H. + 5% BWOC E. + 25% BWOC S.S. + 10% BWOC S.F. + 45% BWOC $Mn_3O_4$ + 2.5 GPS G.B. + 0.35 GPS G.B.S. + 1.2% BWOC H.T.R. + 0.45% BWOC L.T.R. + 0.3% BWOC F.L. |
| 30 | 324 | 22 | 0 | CL-G Cement + 45% BWOC H. + 5% BWOC E. + 25% BWOC S.S. + 10% BWOC S.F. + 45% BWOC $Mn_3O_4$ + 1.5 GPS G.B. + 0.30 GPS G.B.S. + 1.2% BWOC H.T.R. + 0.45% BWOC L.T.R. + 0.3% BWOC F.L. | a settling problem with the formula to be used in deep gas wells, as shown in Table 5.

TABLE 5

Settling results for cement formula #28 at 280° F. and 1,500 psi.

| Section | Measurements #1, Density (pcf) | Measurements #2, Density (pcf) |
|---|---|---|
| Top | 150.11 | 150.38 |
| Middle | 151.35 | 151.58 |
| Bottom | 152.44 | 152.58 |

Table 6 shows the components used in these formulations.

TABLE 6

Components used in the various formulations.

| | |
|---|---|
| Retarders | LTR used in experiments: calcium lignosulfonate<br>HTR used in experiments: ethylene glycol mixture of sodium salt of organic acid & inorganic salt<br>Other possible retarders:<br>modified lignosulfonate, sulfamethylated lignin, inorganic salt, acrylic polymer, sodium lignosulfonate, sodium tetraborate, aromatic polymer derivative, mixture of sodium salt of alicyclic acid & animated aromatic polymer, mixture of aliphatic amide polymer (maximum 30%) and aliphatic amide polymer (60-100%) |
| Friction reducers | Friction reducer used in experiments: sulfonic acid salt<br>Other possible friction reducers: aromatic polymer derivative |
| Fluid loss additives | Fluid loss additive used in experiments: acrylamide copolymer<br>Other possible fluid loss additives: hydroxyethyl cellulose, aliphatic amide polymer, acrylic polymer |
| GBS stabilizer | GBS stabilizer used in experiments: aminated aromatic salt<br>Other possible GBS stabilizers: alkyl phenoxy ether sulfate, aminated aromatic polymer |
| Expansion additive | calcined magnesium oxide |
| Dispersant | sulphonated aromatic polymers |

CONCLUSIONS

Thirty cement blends were tested to develop the most effective cement formula to resist gas migration commonly noted in deep gas wells. Based on the results obtained, it is clear that using silica sand, silica flour, hematite, manganese tetraoxide with expansion additive showed the best performance in terms of gas migration problems, fluid loss control, and minimum settling.

That which is claimed is:

1. A cement composition for preventing gas migration and fluid loss consisting essentially of:
   silica sand in an amount of 10% by weight of cement;
   silica flour in an amount of 25% by weight of cement;
   hematite in an amount of 45% by weight of cement;
   manganese tetraoxide in an amount of 45% by weight of cement;
   calcined magnesium oxide in an amount of 5% by weight of cement;
   ethylene glycol in an amount of 1.2% by weight of cement;
   calcium lignosulfate in an amount of 0.45% by weight of cement; and
   acrylamide copolymer in an amount of 0.3% by weight of cement.

2. The cement composition of claim 1, wherein the silica sand component has an average particle size in a range of from 100 microns to 200 microns.

3. The cement composition of claim 1, wherein the silica sand component has an average particle size of 100 microns.

4. The cement composition of claim 1, wherein the composition has a density of 170 pounds per cubic foot (pcf).

5. The cement composition of claim 1, wherein the composition has a density of at least 170 pcf.

6. The cement composition of claim 1, wherein the composition has a density in a range of from 130 pcf to 180 pcf.

7. The cement composition of claim 1, wherein the silica flour component has an average particle size of 15 microns.

8. The cement composition of claim 1, wherein the hematite component has a specific gravity of 4.95.

9. The cement composition of claim 1, wherein the hematite component has a mean particle size distribution of 45 microns.

10. The cement composition of claim 1, wherein the manganese tetraoxide component has an average particle size of 5 microns.

11. A cement composition for preventing gas migration consisting essentially of:
    silica sand in an amount of 25% by weight of cement;
    silica flour in an amount of 10% by weight of cement;
    hematite in an amount of 45% by weight of cement;
    manganese tetraoxide in an amount of 45% by weight of cement;
    calcined magnesium oxide in an amount of 5% by weight of cement;
    ethylene glycol in an amount of 1.2% by weight of cement;
    calcium lignosulfate in an amount of 0.45% by weight of cement; and
    acrylamide copolymer in an amount of 0.3% by weight of cement.

12. The cement composition of claim 11, wherein the silica sand component has an average particle size in a range of from 100 microns to 200 microns.

13. The cement composition of claim 11, wherein the composition has a density in a range of from 130 pcf to 180 pcf.

14. The cement composition of claim 11, wherein the silica flour component has an average particle size of 15 microns.

15. The cement composition of claim 11, wherein the hematite component has a specific gravity of 4.95.

16. The cement composition of claim 11, wherein the hematite component has a mean particle size distribution of 45 microns.

17. The cement composition of claim 11, wherein the manganese tetraoxide component has an average particle size of 5 microns.

* * * * *